US012682644B2

(12) United States Patent (10) Patent No.: US 12,682,644 B2
Schnattinger et al. (45) Date of Patent: Jul. 14, 2026

(54) SECURITY DETECTION SYSTEM AND METHOD

(71) Applicant: Rohde & Schwarz GmbH & Co. KG, Munich (DE)

(72) Inventors: Georg Schnattinger, Dorfen (DE); Julian Adametz, Nuremberg (DE); Christian Evers, Heimstetten (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 339 days.

(21) Appl. No.: 18/408,978

(22) Filed: Jan. 10, 2024

(65) Prior Publication Data

US 2025/0225794 A1 Jul. 10, 2025

(51) Int. Cl.
*G06V 20/52* (2022.01)
*G06T 7/20* (2017.01)
*G06T 7/70* (2017.01)

(52) U.S. Cl.
CPC ............... *G06V 20/52* (2022.01); *G06T 7/20* (2013.01); *G06T 7/70* (2017.01); *G06T 2207/30196* (2013.01)

(58) Field of Classification Search
CPC ... G06T 2207/30196; G06T 7/20; G06T 7/70; G06V 20/52; G01S 13/88; G01S 13/888
See application file for complete search history.

(56) References Cited

U.S. PATENT DOCUMENTS

| | | | |
|---|---|---|---|
| 6,856,272 B2 * | 2/2005 | Levitan | F41H 13/00 342/52 |
| 6,967,612 B1 * | 11/2005 | Gorman | G01S 13/04 342/52 |
| 9,229,102 B1 * | 1/2016 | Wright | G01S 13/885 |
| 11,017,901 B2 * | 5/2021 | Chevalier | G16H 30/40 |
| 11,880,013 B2 * | 1/2024 | Birnkrant | G01V 8/005 |
| 2004/0140924 A1 * | 7/2004 | Keller | G01N 21/3563 342/179 |
| 2005/0230604 A1 * | 10/2005 | Rowe | G01S 13/89 250/221 |
| 2006/0017605 A1 * | 1/2006 | Lovberg | G01K 7/226 342/179 |
| 2009/0073023 A1 * | 3/2009 | Ammar | G01S 13/89 342/22 |
| 2010/0039309 A1 * | 2/2010 | Carter | G01S 13/426 342/22 |
| 2011/0084868 A1 * | 4/2011 | Daly | G01S 7/415 342/54 |
| 2013/0121529 A1 * | 5/2013 | Fleisher | G01S 7/412 382/103 |

(Continued)

*Primary Examiner* — Peter M Bythrow
(74) *Attorney, Agent, or Firm* — Studebaker Brackett PLLC

(57) ABSTRACT

The present disclosure relates to a security detection system. The system comprises a scanner configured to capture a number n of scans of a person in a scanning area at different body poses of the person; at least one pose detection sensor configured to detect information on the body poses of the person in the scanning area; and a processor configured to correlate sections of the scans which show at least one body part of the person in the different body poses; wherein the scanner is configured to capture at least one of the number of scans during a dynamic movement of the person in the scanning area.

14 Claims, 4 Drawing Sheets

Initial Phase

Static Pose Scanning Phase

Exit Phase

(56)                   References Cited

U.S. PATENT DOCUMENTS

| | | | | |
|---|---|---|---|---|
| 2015/0253422 A1* | 9/2015 | Morton | ................. | G01S 13/887 |
| | | | | 342/146 |
| 2016/0117898 A1* | 4/2016 | Kuznetsov | .............. | H04N 5/30 |
| | | | | 340/600 |
| 2016/0216371 A1* | 7/2016 | Ahmed | ................... | G01S 13/89 |
| 2018/0067204 A1* | 3/2018 | Frizzell | ................ | G01S 13/887 |
| 2018/0172871 A1* | 6/2018 | Kuznetsov | .............. | G01V 3/12 |
| 2019/0108403 A1* | 4/2019 | Smith | ................. | G06V 10/147 |
| 2021/0018595 A1* | 1/2021 | McFadden | ............. | G01S 7/412 |
| 2021/0149047 A1* | 5/2021 | Kempshall | ........... | G01S 13/426 |
| 2021/0364629 A1* | 11/2021 | Ryder | ................. | G06V 10/255 |
| 2022/0057519 A1* | 2/2022 | Goldstein | .............. | G01S 17/88 |
| 2022/0107438 A1* | 4/2022 | Manneschi | ........... | G01V 11/00 |
| 2022/0283287 A1* | 9/2022 | Mcgloin | .............. | G01S 13/343 |
| 2023/0081472 A1* | 3/2023 | Wang | ................... | H04W 4/029 |
| | | | | 340/539.12 |
| 2023/0131216 A1 | 4/2023 | Manneschi | | |
| 2024/0248199 A1* | 7/2024 | Molchanov | ............ | G01S 7/032 |
| 2024/0310512 A1* | 9/2024 | Evsenin | ................. | G01S 13/89 |
| 2024/0329248 A1* | 10/2024 | Smits | .................... | G01S 17/58 |
| 2025/0012895 A1* | 1/2025 | Javadi | .................... | G01S 7/418 |
| 2025/0069256 A1* | 2/2025 | Park | ......................... | G06T 7/75 |
| 2025/0134377 A1* | 5/2025 | Keshmiri | ............ | A61B 5/0015 |

* cited by examiner

Initial Phase

Static Pose Scanning Phase

Exit Phase

40

41 Capturing a number of scans

42 Detecting information on body poses

43 Correlating image sections showing a body part

44 Performing a threat determination

SECURITY DETECTION SYSTEM AND METHOD

TECHNICAL FIELD

The disclosure relates to a security detection system, such as a full body scanner, and to a security detection method.

BACKGROUND ART

Personnel security scanners which operate with millimeter wave radiation are commonly used for threat detection at security checkpoints, e.g., in airports. In most security scanners, the person under investigation assumes a static pose and then a measurement is triggered by the operator or by additional sensors.

For instance, the document US 2023/013126 A1 discloses a detection method for detecting a target object using a detector employing radiant energy. Thereby, a person attains two different positions within the detector and signals representative of radiant energy are acquired during each position. An electronic image is then produced on the basis of the signals so as to determine whether the individual to be inspected is carrying, wearing or bearing a target object.

The detection rate and the false alarm rate are critical operating metrics for such security scanners. Ideally, the detection rate for detecting a security relevant object on the person should be as high as possible, while the false alarm rate should remain as low as possible.

SUMMARY

Thus, there is a need to provide an improved security detection system and an improved security detection method.

This is achieved by the embodiments provided in the enclosed independent claims. Advantageous implementations of the present disclosure are further defined in the dependent claims.

According to a first aspect, the disclosure relates to a security detection system which comprises a scanner configured to capture a number of scans of a person in a scanning area at different body poses of the person; at least one pose detection sensor configured to detect information on the body poses of the person in the scanning area; and a processor configured to correlate sections of the scans which show at least one body part of the person in the different body poses. The scanner is configured to capture at least one of the number of scans during a dynamic movement of the person in the scanning area.

This achieves the advantage that a security detection system with an improved threat detection rate and a reduced false alarm rate is provided. By capturing multiple scans of the person at different poses, an illumination of different body parts in at least some of these scans can be improved which facilitates threat detection, especially in contrast to a threat detection based on purely static pose scans. Furthermore, capturing at least one scan during a movement, e.g. moving in or out of the scanner, can reduce the overall duration of the examination.

The security detection system can be a ranging based security detection system, for instance a personnel security scanner or full-body scanner which operates with microwave or more specifically with millimeter wave (mmWave) radiation. The security detection system can be a microwave and/or mmWave imaging system.

The captured scans can be on-person screening (OPS) images of the person. The number n of scans which is captured by the scanner can be two or more (n≥2).

The correlation of the sections of the scan can comprise a matching and/or a comparison of the sections. This correlation can result in a combined image which shows the at least one body part with a higher level of detail and/or with an enhanced illumination as is shown in the individual scans.

In an implementation form of the first aspect, the dynamic movement of the person comprises a walking in and/or a walking out of the scanning area. Thus, the scanner can capture at least one of the scans during a dynamic pose of the person.

In an implementation form of the first aspect, the scanner is configured to capture at least a further one of the scans while the person stands still in the scanning area. Thus, the scanner can capture at least one of the scans during a static pose of the person.

In an implementation form of the first aspect, the scanner comprises a microwave imaging sensor configured to capture the number of scans.

The microwave imaging sensor can be a mmWave imaging sensor. For instance, the microwave imaging sensor comprises a microwave imaging aperture optimized for static targets and/or a microwave imaging aperture optimized moving targets. The microwave imaging sensor can be a ranging sensor.

In an implementation form of the first aspect, the scanner is configured to adapt an aperture of the microwave imaging sensor based on the information on the body poses detected by the at least one pose detection sensor.

In an implementation form of the first aspect, the processor is configured determine optimal beam configurations of the microwave imaging sensor based on the information on the body poses of the person.

In an implementation form of the first aspect, the microwave imaging sensor is configured to dynamically adapt a beam configuration of the microwave imaging sensor to the body poses of the person. This adaption can be done based on the determined optimal beam configuration(s) for the body pose(s).

For instance, different configuration can be used for different scans depending on a change of the body pose as detected with the pose detection sensor. Thereby, adapting the beam configuration may be achieved by adapting a microwave imaging array, e.g. an antenna array, of the microwave imaging sensor depending on the position of the measurement subject.

In an implementation form of the first aspect, the at least one pose detection sensor comprises any one of the following sensors: an optical image sensor, a time-of-flight sensor, an ultrasonic sensor, an acoustic sensor, a low resolution mmWave scanner, or a photo-electric guard.

In an implementation form of the first aspect, the processor is configured to carry out a threat determination based on the correlated sections of the scans and based on the information on the body poses of the person.

In an implementation form of the first aspect, the security detection system comprises a resource planner which is configured to analyze the correlated sections of the scans and to determine if the at least one body part shown in the correlated sections is sufficiently illuminated in at least a fraction of the scans to carry out the threat determination. This provides the advantage that an excessive number of scans (e.g., duplicative scanning) can be avoided, especially in a tunnel configuration. As a consequence, an overall power consumption of the system can be reduced.

In an implementation form of the first aspect, the threat determination comprises a detection of threats on the person which are covered by materials with low microwave and/or mmWave transparency. A material with low microwave/mmWave transparency can be any material which features a low (or no) transmittance for microwave/mmWave radiation, e.g., shoe leather. A detectable threat could be a dangerous object, such as a weapon.

In an implementation form of the first aspect, the processor is configured to carry out a motion compensation algorithm, especially using the information on the body poses of the person, to determine relative speeds of different body parts of the person and to compensate the captured scans based on the determined relative speeds.

According to a second aspect, the disclosure relates to a security detection method. The method comprises: capturing a number of scans of a person in a scanning area at different body poses of the person; detecting information on the body poses of the person in the scanning area; and correlating sections of the scans which show at least one body part of the person in the different body poses; wherein at least one of the number of scans are captured during a dynamic movement of the person in the scanning area.

In an implementation form of the second aspect, the method further comprises: performing a threat determination based on the correlated sections of the scans and based on the information on the body poses of the person.

The method according to the second aspect of the present disclosure can be carried out by the system of the first aspect of the present disclosure.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
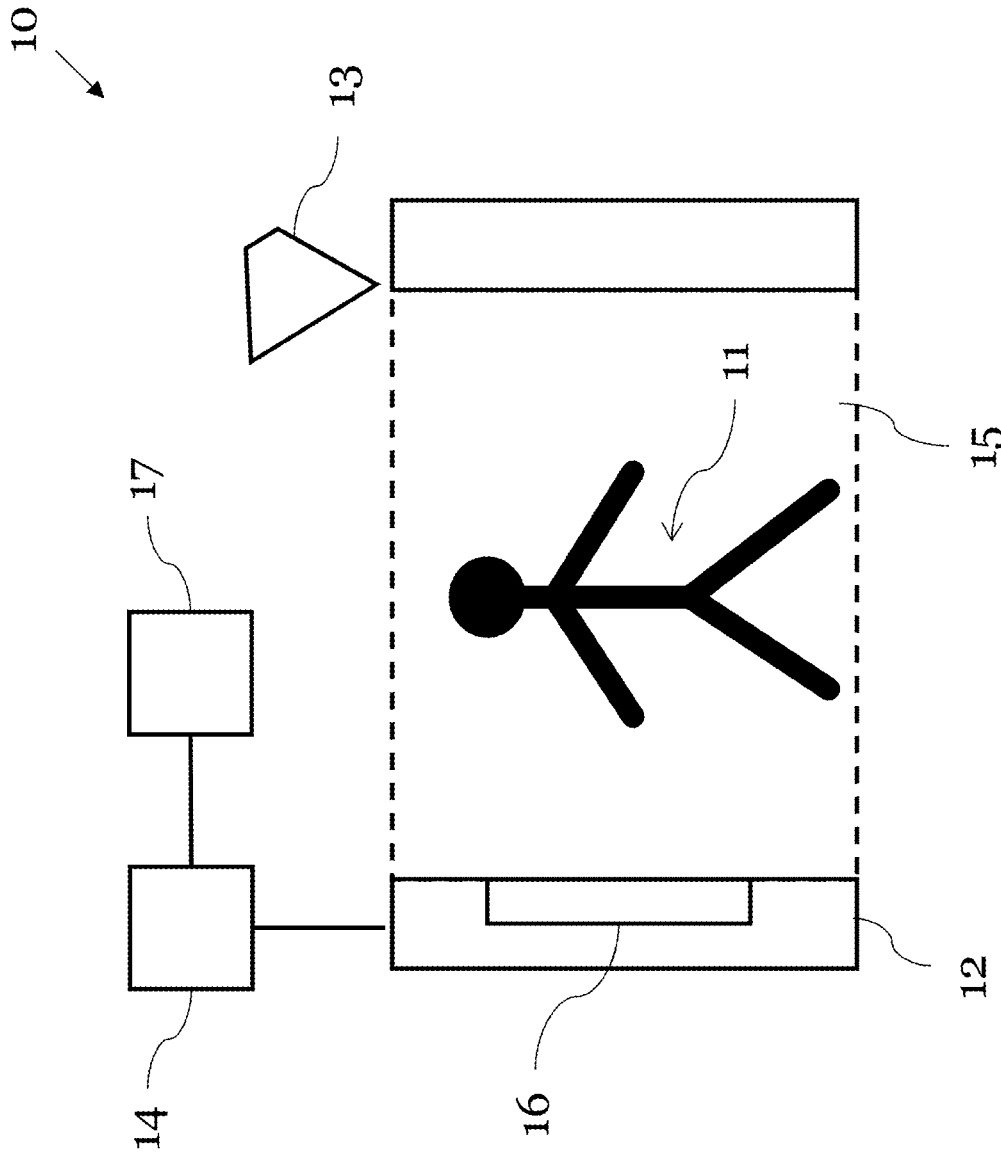
FIG. 1 shows a schematic diagram of a security detection system according to an embodiment.

FIG. 1 shows a schematic diagram of a security detection system 10 according to an embodiment.

The security detection system 10 comprises: a scanner 12 configured to capture a number of scans of a person 11 in a scanning area 15 at different body poses of the person 11; at least one pose detection sensor 13 configured to detect information on the body poses of the person 11 in the scanning area 15; and a processor 14 configured to correlate sections of the scans which show at least one body part of the person 11 in the different body poses. The scanner 12 is configured to capture at least one of the number of scans during a dynamic movement of the person 11 in the scanning area 15.

The dynamic movement of the person 11 can comprises a walking in and/or a walking out of the scanning area. This dynamic movement can be a dynamic pose.

In addition, the scanner can be configured to capture at least a further one of the scans while the person stands still in the scanning area. This may be referred to as a static pose (or static scan pose).

The scanner 12 can comprises a microwave imaging sensor 16 configured to capture the number of scans. This microwave imaging sensor 16 can be a mmWave sensor (e.g., an imaging sensor which emits mmWave radiation towards the person 11 and detects a reflection and/or a transmission of said mmWave radiation from the person 11).

The at least one pose detection sensor 13 can comprise any one or any combination of the following sensors: an optical image sensor (e.g., a camera), a time-of-flight sensor, an ultrasonic sensor, an acoustic sensor, or a photo-electric guard (or barrier).

In case the pose detection sensor 13 comprises a camera or other optical image sensor, it can be configured to capture images of the person, wherein the processor 14 (or a different internal processor of the sensor 13) can analyses said images to determine the information on the body pose and/or additional information (e.g., the presence of objects, special clothing etc.).

In addition or alternatively, the pose detection sensor 13 can be implemented by the microwave imaging sensor 16. For instance, the pose detection sensor 13 may be implemented by the complete microwave imaging sensor 16 or some part of this sensor 16 operating in a similar or a different measurement acquisition mode, for example in a continuous measurement mode, and/or with a lower resolution as is used when capturing the number of scans.

In addition to pose detection, the sensor data provided by the pose detection sensor 13 can be directly or indirectly used by the security detection system 10. For instance, the pose detection sensor 13 can detect if a person walks into the scanning area and trigger other sensors (e.g., the scanner 12 to capture the scans). Furthermore, data from the pose detection sensor 13 can be used to improve the processing of its own or other sensor data (e.g., motion compensation in the captured scans), to dynamically adapt the data acquisition scheme (e.g., reconfiguration the microwave imaging array depending on the position of the measurement subject), and/or to suppress false alarms caused by non-threat objects (e.g., buttons, zippers or heavy clothing). Some of these additional uses of the pose detection sensor 13 will be discussed in the following.

For instance, the pose detection sensor 1 can comprise a photo-electric guard which detects when the person 11 walks in the scanning area 15. This detection can trigger the scanner 12 to capture a first scan of the person 11, e.g., during a dynamic walking-in pose.

Furthermore, the processor 14 can be configured to carry out a motion compensation algorithm, especially using the information on the body poses from the pose detection sensor 13. Thereby, the processor 14 can determine relative speeds of different body parts of the person 11 and compensate one or more captured scans based on the determined relative speeds.

The processor 14 can further be configured to carry out a threat determination based on the correlated sections of the scans. Thereby, the processor 14 can take information from the pose detection sensor 13, e.g. the information on the body poses, into account. For instance, during the threat determination, different types of potentially dangerous objects (e.g., metallic, ceramic, plastic, liquid, organic objects) can be detected in the scans, in particular in the correlated sections of the scans which show the at least one body part.

By additionally using pose detection sensor 13 information (e.g., images captured by a camera), a detection rate of the system 10 can be increased and/or a false alarm rate can be reduced. For instance, if a certain (non-threat) object, such as a zipper, a button, a watch, or a necklace, is detected in the pose detection sensors 13 output exactly where a threat is detected in the scans, the threat can be re-evaluated and possibly disregarded. Thus, the system 10 can carry out a sensor fusion between the measurement results of the scanner 12 and the pose detection sensor 13 to achieve an improved threat detection with reduced false alarm rate.

Moreover, the threat determination can comprises a detection of threats on the person which are arranged below materials with low microwave transparency or more specifically with low mmWave transparency (e.g., shoe leather). For instance, the additional illumination of certain body parts (due to the correlation of the sections of the scans) can be used to determine threats under such harder to penetrate materials.

The system 10 may further comprise a resource planner 17 which is configured to analyze the correlated sections of the scans and to determine if the at least one body part shown in the correlated sections is sufficiently illuminated in at least a fraction of the scans to carry out the threat determination. This can prevent duplicative scanning, especially in a tunnel configuration, and can lead to power improvements (e.g., less power consumption due to unnecessary scans).

Figure 2:
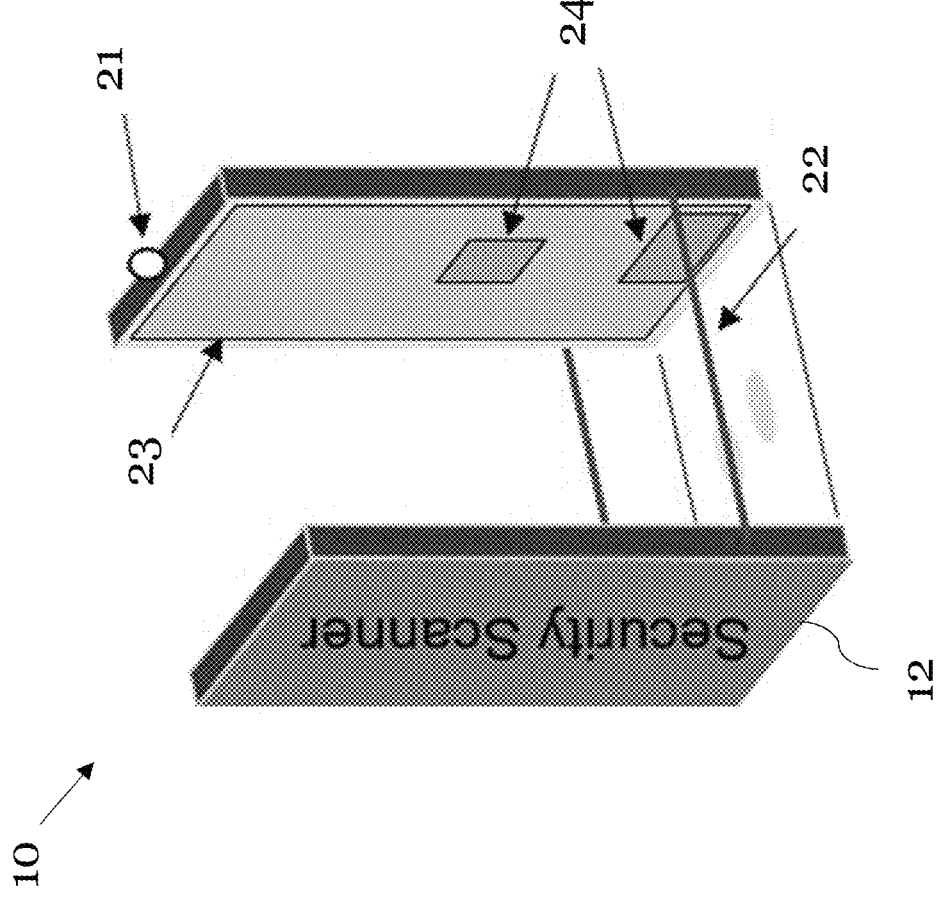
FIG. 2 shows a schematic diagram of a security detection system according to an embodiment.

FIG. 2 shows a schematic diagram of the security detection system 10 according to an embodiment. In this example, the pose detection sensor 13 comprises an optical image sensor 21 and two photo-electric guards 22 for detecting when the person 11 steps into and out of the scanning area 15.

The scanner 12 of the system 10 can be configured to adapt at least one aperture of the microwave imaging sensor 16 based on the information on the poses detected by the at least one pose detection sensor 13.

As shown in FIG. 2, the scanner can comprise a microwave imaging aperture 23 for static targets and/or at least one microwave imaging aperture 24 for moving targets. The size of at least one of these apertures 23, 24 can be adapted based on the information on the pose.

For instance, the scanner 12 or more specifically the microwave imaging sensor 16 can comprise at least one antenna array (e.g., a RX/TX antenna array), wherein the apertures 23, 24 correspond to a portion of the array(s) which are used to transmit and/or receive microwave or mmWave radiation. In an example, the scanner 12 could adapt the aperture(s) 23, 24 by adjusting the number of active antennas used for detection during the static and/or during the dynamic scan. Thereby, the aperture(s) 23, 24 of the antenna array(s) could be limited to an area of interest, the exact size and position of which depends on the pose of the person 11.

By adapting the aperture of the microwave imaging sensor 16 to a pose of the person, a number of advantages can be achieved: The power consumption of the microwave imaging sensor can be reduced; motion blurring in the scans can be reduced; processing of less relevant data can be avoided (reduced processing efforts); a distinguishing between different people in the scanner can be facilitated; EMI, EMS & absorption of radiation by the human body can be reduced; and/or beam forming systems for changing a beam configuration of a mmWave beam can be controlled.

For instance, the processor 14 can be configured to determine optimal beam configurations of the microwave imaging sensor 16 based on the information on the body poses of the person 11. Thereby, beam configuration means the configuration (e.g., shape) of an EM beam used for scanning the person, e.g. a microwave or more specifically a mmWave beam. For instance, the EM beam can be emitted by the Rx antennas of the antenna array of the microwave imaging sensor 16, which can be adapted to generate certain beam shapes.

For example, the microwave imaging sensor 16 can be configured to dynamically adapt the beam configuration (e.g., beam shape) to the body poses of the person based on the determined optimal beam configuration.

For instance, the pose detection sensor 13 (or the processor 14 which receives the sensor 13 output) can plan a beam configurations of the beam forming microwave imaging sensor 16 to efficiently change from one configuration to another between different scans.

In summary, information from the pose detection sensor 13 can be used to operate the system 10 in new modes of operation, to improve the system performance and to allow for new applications and settings (e.g., scanning shoes for dielectric threats). The performance of the system 10 can be improved by combining the evaluation of a static pose measurement together with additional data which is captured before and/or after the static pose measurement using the same or additional sensors. This can result in an improved display of visual results, a reduction of a false alarm rate and/or an improvement of a detection rate. Furthermore, by this combination of different sensor readings, the overall operational costs of the system 10 can be reduced.

Figure 3:
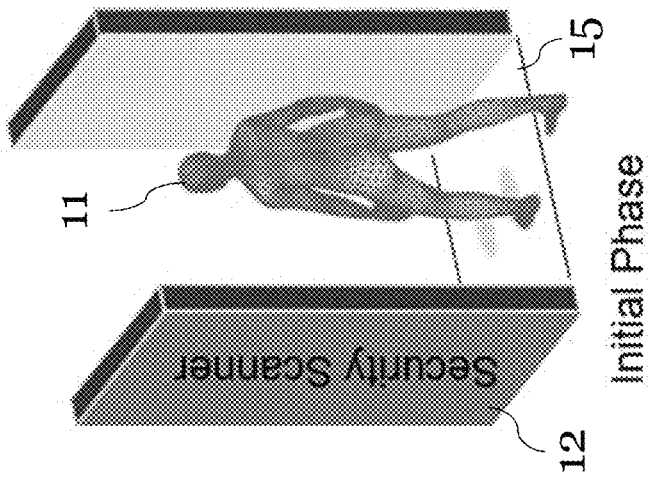
FIG. 3 shows a use of a security detection system according to an embodiment.
Figure 3:
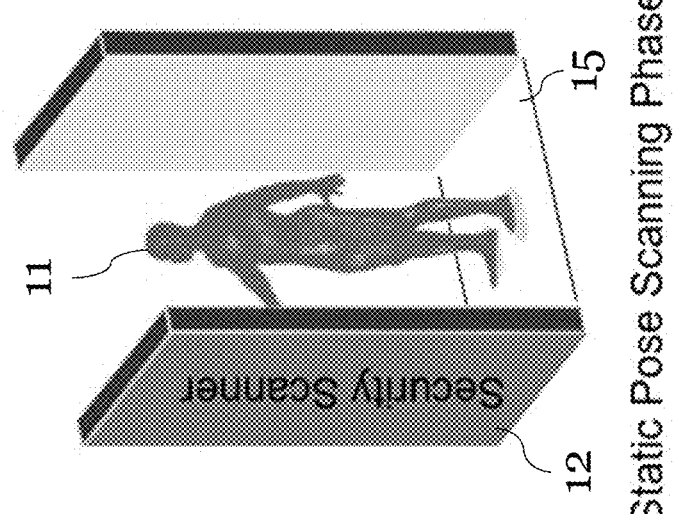
Figure 3:
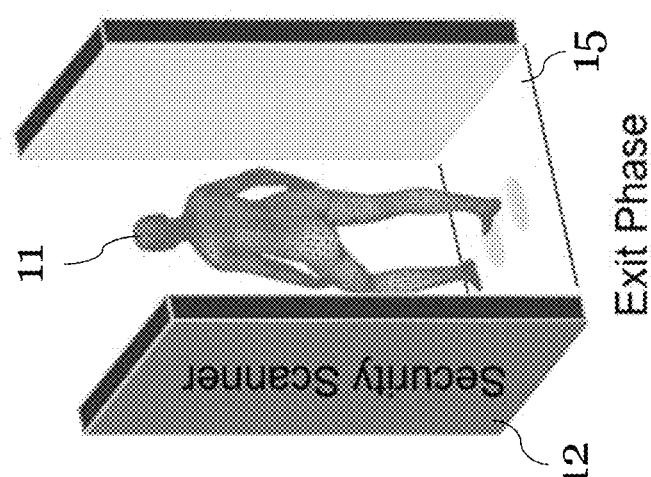

FIG. 3 shows the use of a security detection system according to an embodiment. In an initial phase, the person steps into the scanning area 15. The pose detection sensor 13 can detect this dynamic pose (walking in) and e.g. trigger the scanner to capture a scan. In a subsequent static pose scanning phase a conventional static scan can be carried out. During an exit phase, the pose detection sensor 13 could detect the person leaving of the scanning area and optionally trigger the scanner 12 to capture another dynamic pose scan.

The system 10 can acquire data from all three phases in FIG. 3 by the adaptive data acquisition scheme discussed above and use this data for threat detection.

Figure 4:
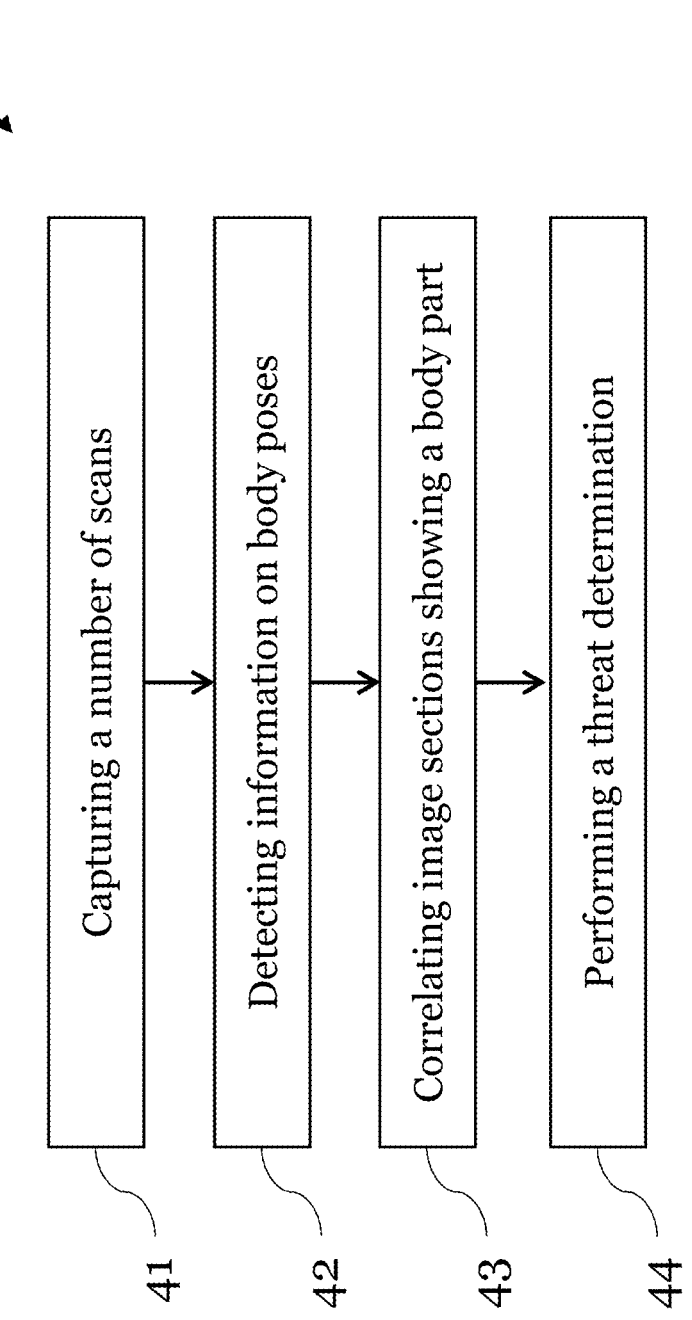
FIG. 4 shows a flow chart of a security detection method according to an embodiment.

FIG. 4 shows a flow chart of a security detection method 40 according to an embodiment. The method 40 can be carried out by the system 10 as shown e.g. in FIG. 1 or 2.

The method 40 comprises: capturing 41 the number of scans of the person 11 in the scanning area 15 at different body poses of the person 11; detecting 42 information on the body poses of the person 11 in the scanning area 15; and correlating 43 sections of the scans which show at least one body part of the person 11 in the different body poses; wherein at least one of the number of scans are captured during the dynamic movement of the person 11 in the scanning area 15.

The method 40 can further comprise the step of: performing 44 the threat determination based on the correlated sections of the scans and based on the information on the body poses of the person 11.

All features described above or features shown in the figures can be combined with each other in any advantageous manner within the scope of the disclosure.

The invention claimed is:

1. A security detection system, comprising:
   a scanner configured to capture a number of scans of a person in a scanning area at different body poses of the person;

at least one pose detection sensor configured to detect information on the body poses of the person in the scanning area; and a processor configured to correlate sections of the scans which show at least one body part of the person in the different body poses, wherein the correlation comprises matching and/or comparing the sections to generate a higher level of detail and/or an enhanced illumination of the at least one body part; and wherein the scanner is configured to capture at least one of the number of scans during a dynamic movement of the person in the scanning area.

2. The security detection system of claim 1, wherein the dynamic movement of the person comprises a walking in and/or a walking out of the scanning area.

3. The security detection system of claim 1, wherein the scanner is configured to capture at least a further one of the scans while the person stands still in the scanning area.

4. The security detection system of claim 1, wherein the scanner comprises a microwave imaging sensor configured to capture the number of scans.

5. The security detection system of claim 4, wherein the scanner is configured to adapt an aperture of the microwave imaging sensor based on the information on the body poses detected by the at least one pose detection sensor.

6. The security detection system of claim 4, wherein the processor is configured determine optimal beam configurations of the microwave imaging sensor based on the information on the body poses of the person.

7. The security detection system of claim 4, wherein the microwave imaging sensor is configured to dynamically adapt a beam configuration of the microwave imaging sensor to the body poses of the person.

8. The security detection system of claim 1, wherein the at least one pose detection sensor comprises any one of the following sensors: an optical image sensor, a time-of-flight sensor, an ultrasonic sensor, an acoustic sensor, a low resolution mmWave scanner, or a photo-electric guard.

9. The security detection system of claim 1, wherein the processor is configured to carry out a threat determination based on the correlated sections of the scans and based on the information on the body poses of the person.

10. The security detection system of claim 9, wherein the threat determination comprises a detection of threats on the person which are covered by materials with low microwave and/or mmWave transparency.

11. The security detection system of claim 9, further comprising:

a resource planner which is configured to analyze the correlated sections of the scans and to determine if the at least one body part shown in the correlated sections is sufficiently illuminated in at least a fraction of the scans to carry out the threat determination.

12. The security detection system of claim 1, wherein the processor is configured to carry out a motion compensation algorithm; to determine relative speeds of different body parts of the person and to compensate the captured scans based on the determined relative speeds.

13. A security detection method, comprising:

capturing a number of scans of a person in a scanning area at different body poses of the person;

detecting information on the body poses of the person in the scanning area; and correlating sections of the scans which show at least one body part of the person in the different body poses by matching and/or comparing the sections to generate a higher level of detail and/or an enhanced illumination of the at least one body part;

wherein at least one of the number of scans are captured during a dynamic movement of the person in the scanning area.

14. The method of claim 13, further comprising:

performing a threat determination based on the correlated sections of the scans and based on the information on the body poses of the person.

* * * * *